United States Patent
Asveren

(10) Patent No.: US 11,115,453 B2
(45) Date of Patent: Sep. 7, 2021

(54) METHODS AND APPARATUS FOR COMMUNICATING DELAY INFORMATION AND MINIMIZING DELAYS

(71) Applicant: Ribbon Communications Operating Company, Inc., Westford, MA (US)

(72) Inventor: Tolga Asveren, Bordentown, NJ (US)

(73) Assignee: Ribbon Communications Operating Company, Inc., Westford, MA (US)

( * ) Notice: Subject to any disclaimer, the term of this patent is extended or adjusted under 35 U.S.C. 154(b) by 0 days.

(21) Appl. No.: 16/677,320

(22) Filed: Nov. 7, 2019

(65) Prior Publication Data
US 2020/0076868 A1 Mar. 5, 2020

Related U.S. Application Data

(63) Continuation of application No. 14/582,770, filed on Dec. 24, 2014, now Pat. No. 10,484,447.

(51) Int. Cl.
*G06F 13/00* (2006.01)
*H04L 29/06* (2006.01)

(52) U.S. Cl.
CPC .......... *H04L 65/608* (2013.01); *H04L 65/604* (2013.01); *H04L 65/80* (2013.01)

(58) Field of Classification Search
CPC ...... H04L 65/608; H04L 65/604; H04L 65/80
USPC .......................... 709/231, 230, 234, 246, 224
See application file for complete search history.

(56) References Cited

U.S. PATENT DOCUMENTS

| | | | | |
|---|---|---|---|---|
| 8,094,556 B2 * | 1/2012 | Michaelis | ............. | H04L 47/283 370/230.1 |
| 9,374,263 B2 * | 6/2016 | Hughes | ............. | H04L 29/06027 |
| 9,380,327 B2 * | 6/2016 | Syed | ................ | H04N 21/23439 |
| 9,742,820 B2 * | 8/2017 | Hughes | ............... | H04L 65/1006 |
| 10,484,447 B2 * | 11/2019 | Asveren | .................. | H04L 65/80 |
| 2008/0080568 A1 * | 4/2008 | Hughes | .................. | H04L 65/80 370/519 |
| 2010/0271944 A1 * | 10/2010 | Michaelis | ............... | H04L 65/80 370/230.1 |
| 2012/0036277 A1 | 2/2012 | Stokking et al. | | |
| 2013/0156094 A1 * | 6/2013 | Syed | .................... | H04N 19/184 375/240.02 |

(Continued)

*Primary Examiner* — Kenneth R Coulter
(74) *Attorney, Agent, or Firm* — Straub & Straub; Stephen T. Straub; Michael P. Straub

(57) ABSTRACT

Features relating to communicating delay information and minimizing aggregate processing delays corresponding to content streams, e.g., audio and video streams, in a multi-media communication session while still achieving stream synchronization, are described. Some embodiments are well suited for systems where video and audio streams are transcoded by different entities. In some embodiments downstream entities, e.g., transcoder and/or receiving end device, are informed about the delay introduced to at least one stream by one or more upstream devices, e.g., a transcoder. The downstream entity synchronizes the received content streams by adding artificial latency as needed to the relevant one of the streams based on the received delay information thereby avoiding unnecessary introduction of artificial delays at every transcoding node in the path. Received delay information for a content stream may indicate one or more individual transcoding delays introduced into the stream or an aggregate of transcoding delays introduced into the stream.

20 Claims, 7 Drawing Sheets

(56) References Cited

U.S. PATENT DOCUMENTS

2016/0134833 A1* 5/2016 Greene .............. H04N 21/4126
 386/207
2016/0248822 A1* 8/2016 Hughes ............. H04L 29/06027

* cited by examiner

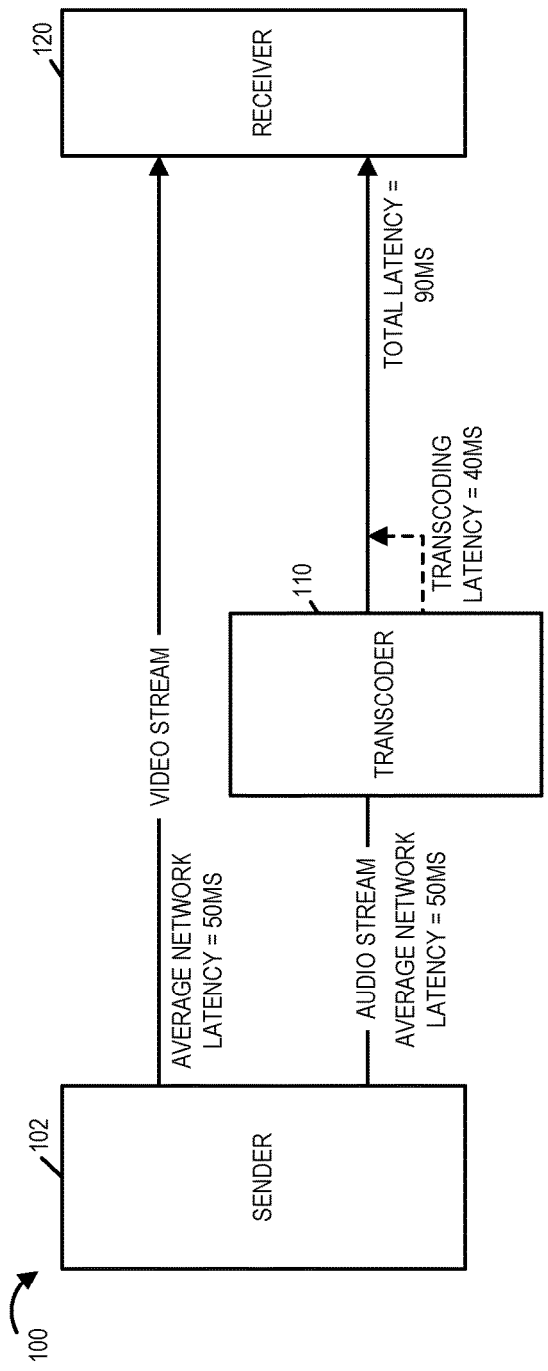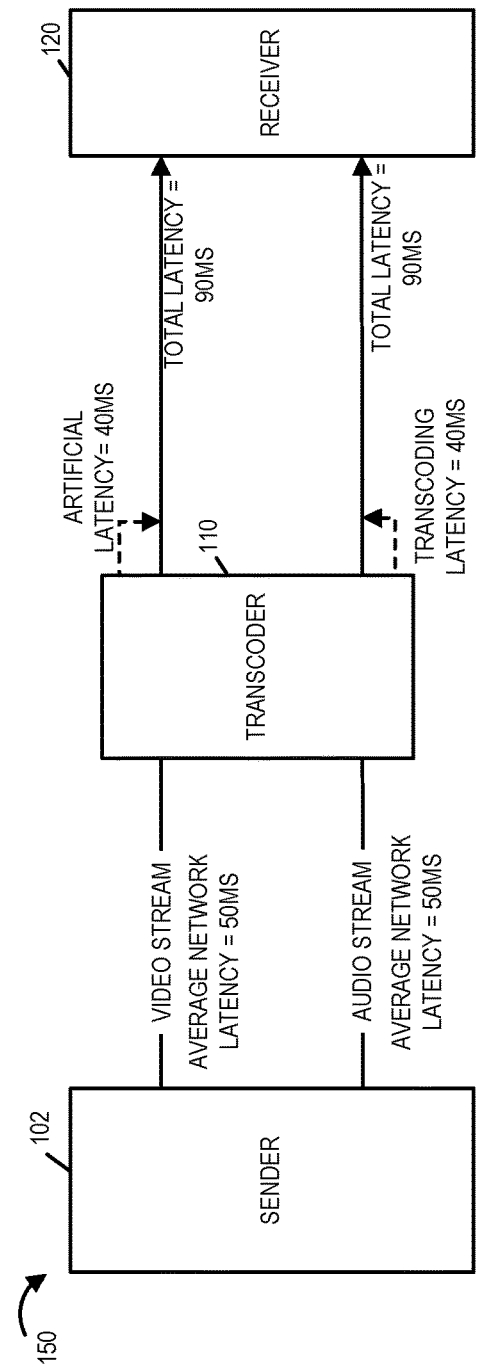

METHODS AND APPARATUS FOR COMMUNICATING DELAY INFORMATION AND MINIMIZING DELAYS

RELATED APPLICATIONS

The present application is a continuation of U.S. patent application Ser. No. 14/582,770, now U.S. Pat. No. 10,484, 447 which was filed on Dec. 24, 2014 which published as U.S. Patent Application Publication No. US-2016-0191592-A1 on Jun. 30, 2016 and is hereby expressly incorporated by reference in its entirety.

FIELD OF INVENTION

The present invention relates to methods and apparatus for communicating delay information and minimizing aggregate delays during content transmission between devices, e.g., in a multimedia communications session.

BACKGROUND

Content delivery in a multi-media communication session includes communication of audio and video content streams from a sender such as a content delivery server to one or more end devices. Typically in the content delivery path between the sender to the end device, the audio and video content streams may be sampled, transcoded, transrated and/or subjected to further processing at one or more points by devices.

Transcoding refers to the functionality of changing the format of a media stream encoded according to a certain codec to encoding according to some other codec. Transcoding is applicable to both audio and video media types. There could be scenarios, where transcoding is needed for both audio and video streams of a communication session and where the transcoding occurs in different devices for the audio content stream then for video content stream.

Like various other processing operations, transcoding operations introduce latency and/or delays into the content stream being transcoded. Transcoding between two codecs introduce a delay causing a distortion in the end-to-end latency. Delays introduced into a content stream subject to transcoding may depend on a number of factors such as for example the type of content stream, type of transcoding device, etc. While multimedia content may include both audio and video content, the video and audio coding/compression formats are different for audio and video packets which include the audio and video content respectively. During delivery of content from a source to a destination end device, the audio and video content streams may be subject to one or multiple transcoding operations. While each transcoding operation may introduce some delay into the content stream being processed, many times the delay introduced into an audio content stream by an audio transcoder is different from the delay introduced into a video content stream by a video transcoder corresponding to the same multimedia session to which the audio content steam corresponds. This results in the two content streams corresponding to the same multimedia session being out of synchronization, that is, the audio content stream has a different latency introduced into it than the latency introduced into the video content stream.

Lip synchronization is the functionality of aligning audio and video content streams, e.g., audio and video, so that the end user is presented a coherent view. Generally, at a high conceptual level, there are two lip synchronization approaches: i) deducing a relationship between the timestamps and arrival times of RTP packets for each stream separately and then using this information to synchronize the streams; and ii) calculating the wall clock time for each RTP packet and synchronizing packets on both streams. This second approach requires use of Real-time Transport Protocol (RTCP) and a common wall clock for the devices performing audio/video transcoding.

Both methods of synchronization would benefit if the end-to-end latency for the two streams is close. For the first approach, having close end-to-end latency for the two streams is essential as arrival time is a key component of the procedure. For the second approach, differences in latency may cause some packets being played without waiting for their counterpart(s) on the other stream which results incoherent non synchronized presentation of content. Thus achieving close end-to-end latency is highly desirable.

In some cases while one of the content streams may be transcoded the other content stream may not need transcoding prior to delivery to the receiving device thus again resulting in different latencies for the two content streams. Some attempts to address the problem of unmatched latencies for the two streams have included introducing an artificial delay, at the transcoder node, into the content stream not being transcoded by the given transcoder thereby attempting to synchronize the non-transcoded stream with a content stream transcoded by the transcoder node. Since transcoding introduces delay into the transcoded stream, if an artificial delay of equal amount could be introduced into the non-transcoded stream this would theoretically make them equally delayed from the perspective of the transcoder node. FIG. 1A illustrates a drawing 100 which shows audio and video content streams communicated from a sender 102 to a receiver 120. In the illustrated drawing while the audio content stream is subject to a transcoding operation by the transcoder 110, the video content stream is communicated without a transcoding operation. Here transcoding the audio stream introduces transcoding latency into the audio stream which in combination with network latency adds up to a total of 90 ms latency being added to the audio stream. Since the network latency which is 50 ms in this example is the same for both audio and video streams, the total latency for the video stream which is not subjected to transcoding is only 50 ms. The problem of different delays for different streams can be appreciated from drawing 100 wherein it is shown that transcoding one of the content streams by not the other causes the two streams to get out of synchronization and have different latencies.

FIG. 1B is a drawing 150 that illustrates one approach used to address the problem of mismatched latencies caused due to one of the content streams being transcoded as discussed above with regard to FIG. 1A. In the approach illustrated by drawing 150 the distortion in the end to end latency is addressed by introducing artificial latency at the transcoding device into the non-transcoded stream so that the total latency of the non-transcoded stream matches that of the transcoded stream. As shown in drawing 150 the audio content stream is transcoded by the transcoder 110 thereby adding 40 ms latency to the audio content stream which already includes an average network latency of 50 ms resulting in a total latency of 90 ms for the audio content stream. To address the effect of latency mismatch and distortions the transcoder 110 introduces artificial latency into the non-transcoded video stream thereby causing the total latency for the video stream to be 90 ms as well.

While such an approach as discussed with regard to FIG. 1B achieves stream synchronization from the perspective of transcoder node, this approach has issues if the two content streams are transcoded by different transcoding entities. Both transcoding entities may be adding some artificial latency to the stream which is not transcoded from their perspective causing the total cumulative latency for each stream to increase significantly. This problem is illustrated in FIG. 2 which shows how the aggregate latency for each stream is increased when the content streams are transcoded by different transcoding entities.

FIG. 2 illustrates a system 200 that includes the same or similar system elements as shown in FIGS. 1A and 1B in addition to an additional transcoding device. The system elements that are the same have been identified by the same reference numbers as used earlier. The system operates in a similar manner as discussed in FIG. 1B except that in system 200 the two content streams are transcoded by different transcoding entities with the audio content stream being transcoded by Transcoder-1 112 and the video content stream being transcoded by Transcoder-2 114. To eliminate the latency distortion from the perspective of an individual transcoder, each transcoder adds of an artificial latency to the non-transcoded stream, i.e., the content stream that the individual transcoder does not transcode. As can be appreciated from FIG. 2, Transcoder-1 112, e.g., an audio transcoder, transcodes the audio content stream and introduces a transcoding latency of 40 ms to it while adding an equal amount of 40 ms latency to the non-transcoded video stream in order to overcome latency distortions in the two streams from its perspective.

The two content streams next pass through Transcoder-2 114, e.g., video transcoder, which transcodes the video content stream and introduces a transcoding latency of 60 ms to it while adding an equal amount of 60 ms latency to the non-transcoded audio content stream in order to overcome latency distortions in the two streams from its perspective. As should be appreciated this results in a total aggregate latency of 100 ms for both the streams which is significantly greater compared to the individual transcoding latencies introduced in each stream due to transcoding. Thus it should be appreciated that the above discussed approaches suffer from drawbacks such as increasing the total aggregate delay for the content streams.

From the above discussion it should be appreciated that there is a need for methods and apparatus that eliminate or reduce the stream latency mismatch between content streams without significantly increasing the aggregate stream latencies corresponding to the content streams. There is a further need that such methods and apparatus minimize aggregate delays for the content streams.

SUMMARY

Various features relating to communicating delay information and minimizing aggregate processing delays corresponding to content streams, e.g., audio and video content streams, in a multi-media communication session while still achieving stream synchronization, are described. Some embodiments are well suited for systems where video and audio streams are transcoded by different entities. For example, traffic may be originating from WebRTC domain and terminating in a legacy video conferencing server, where audio transcoding is performed by a session border controller (SBC) and video transcoding by an element in the video conferencing system.

In some embodiments downstream entities, e.g., transcoder and/or receiving end device such as a playback device, are informed about the transcoding delay introduced to at least one stream by one or more upstream devices, e.g., a transcoders. In accordance with the features of some embodiments the downstream entity synchronizes the two received content streams by adding artificial latency as needed to the relevant one of the streams based on the received transcoding delay information from the upstream device thereby avoiding unnecessary introduction of artificial delays at every transcoding node in the path. Minimizing introduction of artificial delays facilitates minimizing aggregate processing delays.

In some embodiments the downstream entity, e.g., receiving end device, receives the delay information regarding one or more delays and/or latencies introduced into the content streams from one or more devices. In some embodiments the received delay information corresponding to a first content stream indicates one or more individual transcoding delays introduced into the first content stream. In some other embodiments the received delay information indicates an aggregate of one or more transcoding delays introduced into the first stream. The delay and/or latency information may be communicated by an upstream device, e.g., a transcoding device. In some embodiments the receiving device receives delay information from one or more individual transcoding devices that performed transcoding on the first stream, each indicating a transcoding delay that the individual device introduced into the first stream.

In some embodiments notifying a downstream entity is done with one of a Session Description Protocol (SDP) attribute, a Session Initiation Protocol (SIP) message header/parameter, or using a special signaling port etc. In some embodiments the notification includes information about the stream, which is transcoded and the latency introduced. In some embodiments the notification includes information that transcoding has happened for a stream and the type of transcoding. In some such embodiment latency information corresponding to the type of transcoding may be configured in the downstream device to which the notification is communicated. In some embodiments the downstream device is another transcoder.

In some embodiments the downstream device is a playback device. In some such embodiments an indication regarding the transcoding latency introduced for each stream is sent to the receiving playback device which uses this information to synchronize the streams prior to outputting the streams to a user.

In some other embodiments if a first transcoding entity knows that the one of the content streams is going to be transcoded downstream in the communication path and the corresponding latency that would be introduced, the first transcoding entity can, and in some embodiments does, adds artificial latency to the content stream and signals to the downstream transcoding entity that no artificial latency should be added at the downstream transcoding entity.

An exemplary method of communicating content streams corresponding to a multi-media communications session in accordance with one embodiment comprises performing, at a first transcoder, a transcoding operation on a first content stream which is part of the multi-media communications session which also includes a second content stream; and communicating information to a downstream device indicating a delay introduced into the first content stream by said transcoding the first content stream. In some embodiments the delay introduced into the first content stream by the transcoding operation is communicated in a message sent from the first transcoder to the downstream device. In some embodiments the delay introduced into the first content stream by the transcoding operation is communicated in a SDP attribute or SIP header/parameter corresponding to the first content stream. In still some other embodiments the delay introduced into the first content stream by the transcoding operation is communicated by adding the delay information into information communicated in said first content stream. In some embodiments the first content stream is one of an audio and a video content stream and the second content stream is also one of an audio and video content stream, only one of the first and second content steams being an audio content stream. In some embodiments the downstream device is one of another transcoder or a playback device.

An exemplary system for communicating content streams corresponding to a multi-media communications session in accordance with one embodiment comprises: a first transcoder and a downstream device. In various embodiments the first transcoder comprises at least one processor configured to perform a transcoding operation on a first content stream which is part of the multi-media communications session which also includes a second content stream, and communicate information to the downstream device indicating a delay introduced into the first content stream by said transcoding the first content stream.

An exemplary method of operating a receiver device in accordance with one embodiment comprises: receiving a first content stream which was subject to transcoding prior to receipt, receiving a second content stream, determining a stream delay difference between said first content stream and said second content stream, and delaying the second content stream by the amount of the determined stream delay difference. In some embodiments the stream delay different is determined based on information indicating one or more latencies corresponding to the first content stream and information indicating one or more latencies corresponding to the second content stream.

In some embodiments information indicating one or more latencies corresponding to the first content stream is communicated by one of a first SDP attribute, a first SIP message header, a SIP parameter or a first signaling port used to indicate latency information corresponding to the first content stream or a first notification message providing transcoding delay information for the first content stream. In some embodiments the information indicating one or more latencies corresponding to the second content stream is communicated by one of a second SDP attribute, a second SIP message header, a second SIP parameter, a second signaling port used to indicate latency information corresponding to the second content stream or a second notification message providing transcoding delay information for the second content stream.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 1A illustrates communication of audio and video content streams from a sender to a receiver in a system where transcoding operation is performed on one of the content streams resulting in distortion in end to end latency.

FIG. 1B is a drawing illustrating an approach used to address the problem of mismatched latencies caused due to one of the content streams being transcoded as discussed with regard to FIG. 1A.

DETAILED DESCRIPTION

Figure 2:
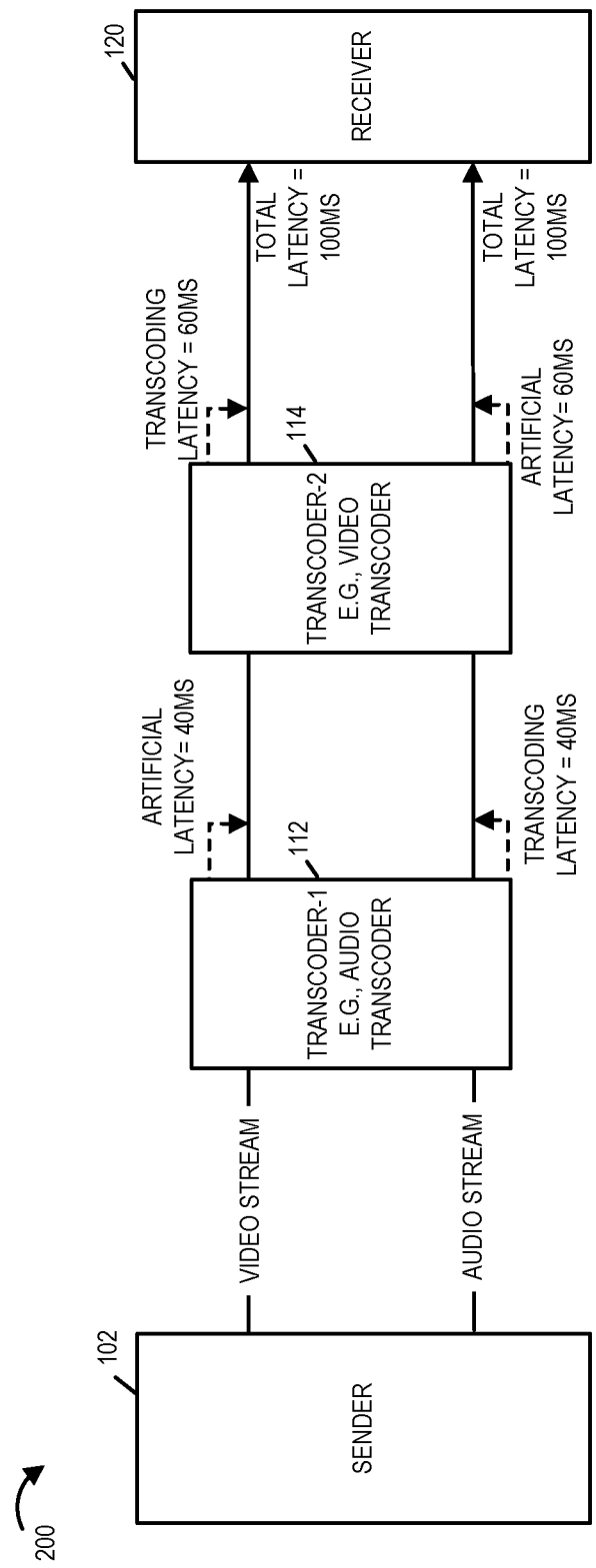
FIG. 2 illustrates a system that includes the same or similar system elements as shown in FIGS. 1A and 1B but with different transcoding devices for transcoding audio and video streams.
Figure 3:
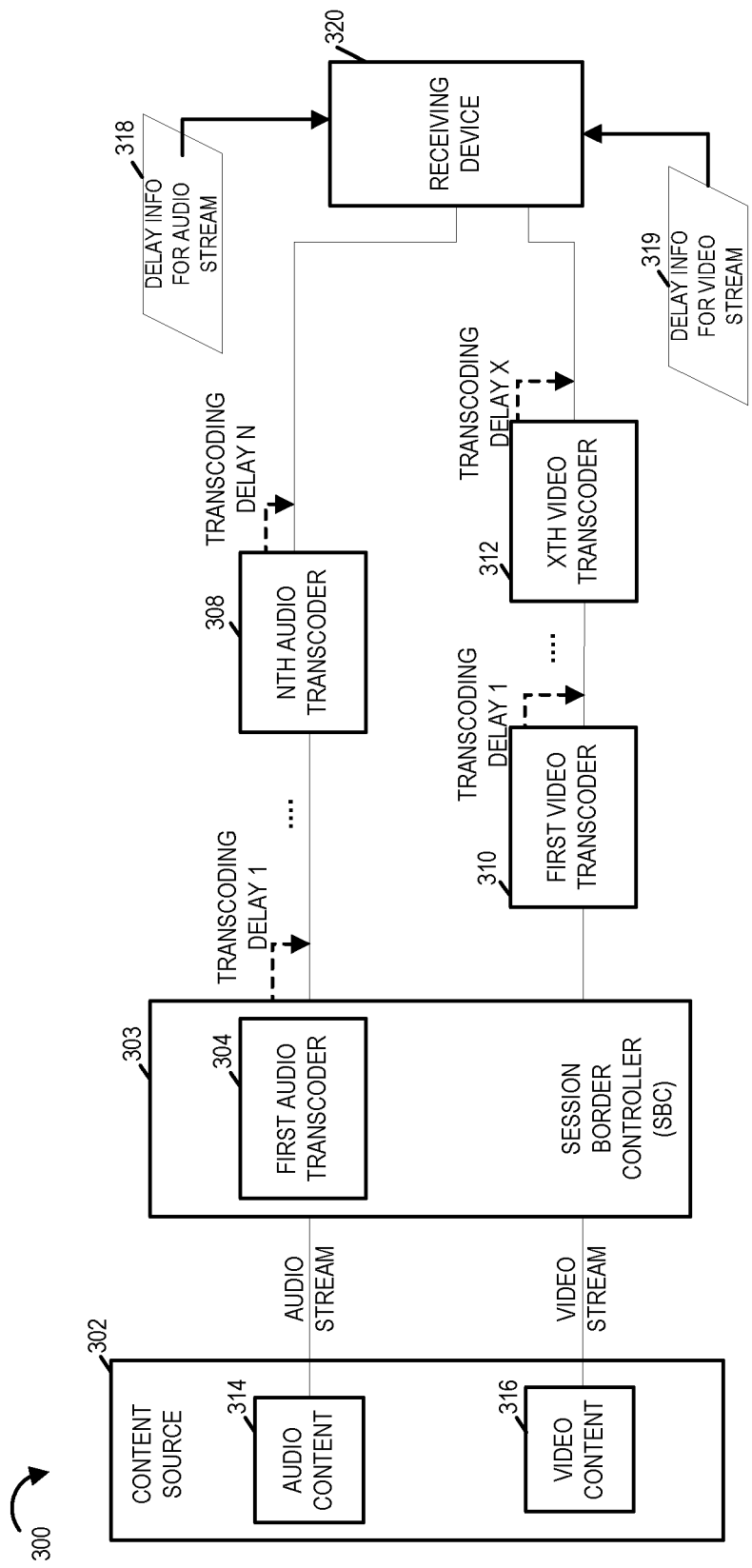
FIG. 3 illustrates an exemplary system implemented in accordance with an exemplary embodiment of the invention.

FIG. 3 illustrates an exemplary system 300 in accordance with an exemplary embodiment. System 300 includes various devices that may participate in content delivery from source via one or more content streams, e.g., real time transport streams, to at least a receiving device. As illustrated system 300 includes a content source 302, a plurality of audio transcoders (including first audio transcoder 304, . . . , Nth audio transcoder 308), a plurality of video transcoders (including first video transcoder 310, . . . , Xth video transcoder 312), and a receiving device 320. The content source 302 may be, e.g., a regional or national content store, storing multimedia content which can be delivered to one or more customer devices. In some embodiments, as illustrated in the system 300, a transcoding operation may be performed in a session border controller (SBC), such as by the first audio transcoder 304 included in the SBC 303. While not necessary in all embodiments, in some embodiments the audio and video streams are routed along different paths.

The audio transcoders (first audio transcoder 304, . . . , Nth audio transcoder 308) transcode audio content stream from one audio coding format, e.g., OPUS format, to another audio coding format, e.g., G.726 format. Thus each of the first audio transcoder 304 through Nth audio transcoder 308 is capable of transcoding audio content of an input content stream from one format to another depending on the type of audio transcoder. The video transcoders (first video transcoder 310 through Xth video transcoder 312) transcode video content stream from one video coding format, e.g., VP8 format, to another video coding format, e.g., H.264 format. Thus each of the first video transcoder 310 through Xth video transcoder 312 is capable of transcoding video content of an input content stream from one format to another depending on the type of video transcoder. In a transcoding operation, e.g., audio or video transcoding, a delay is introduced in the content stream being transcoded as a result of the transcoding operation. However the delays associated with different transcoders performing the transcoding operations may be, and in various cases are, different.

In system 300 while the first audio transcoder 304 in SBC 303 which receives both content streams transcodes the audio stream and introduces a transcoding delay 1 into the audio stream, it should be appreciated that in contrast to other systems no artificial delay is introduced into the video stream in accordance with the features of the invention. This approach facilitates minimizing the aggregate delay corresponding to each of the streams by not introducing artificial delay at every processing node thereby reducing the aggregate delay corresponding to the stream as seen by the receiving end device.

Each of the other transcoders that transcodes the content stream introduces a corresponding delay. The first audio transcoder 304 introduces a transcoding delay 1 into the audio stream, . . . , Nth audio transcoder 308 introduces a transcoding delay N into the audio stream. Similarly the first video transcoder 310 introduces video transcoding delay 1 into the video stream, . . . , Xth video transcoder 312 introduces video transcoding delay X into the video stream.

In accordance with one aspect of some embodiments each of the audio and video transcoders is configured to communicate to a downstream device, e.g., another transcoder and/or a receiving end device, information indicating a delay introduced into a transcoded content stream. In some embodiments at least one transcoder communicates additional information to the downstream device indicating one or more additional delays introduced into a content stream being provided by one or more devices, e.g., by one or more other devices upstream of the at least one transcoder. For example the Nth audio transcoder 308 may receive information about delays introduced by other upstream devices (e.g., by the first transcoder 304 and other devices in the content delivery path) and communicates the information indicating the delays along with information about the delay the Nth transcoder 308 introduced into the audio content stream, to the receiving device 320. Similarly, in some embodiments the Xth video transcoder 312 may receive information about delays introduced by other upstream devices (e.g., by the first video transcoder 310 and other devices in the content delivery path) and communicates the information indicating the delays along with information about the delay the Nth transcoder 308 introduced into the audio content stream, to the receiving device 320. In some embodiments the communicated delay information individually indicates one or more delays introduced by various individual transcoders. In some other embodiments the communicated the delay information indicates aggregate delay introduced into the content stream by one or more devices. Thus in some embodiments a transcoder, e.g., Nth audio transcoder 308 and/or Xth video transcoder 312, that receives transcoding delay information from another upstream device (first audio transcoder 304 and/or first video transcoder 310) adds up the delays introduced by the other upstream device(s) to the delay that it introduces into the transcoded content stream and sends the delay information, e.g., aggregate delay, to the next downstream device, e.g., another transcoder or the receiving end device 320.

The content receiving device 320 may be e.g., a content playback device such as a set top box, or another transcoding device, or another intermediary network element, or another customer device receiving the content streams, e.g., audio and video content streams, which have been subject to one or more transcoding operations by one or more transcoders. In various embodiments the receiving device 320 receives audio and video content streams corresponding to a multimedia session. In various embodiments the receiving device 320 receives delay information 318, 319 corresponding to the audio and video streams. In accordance with one aspect of some embodiments the receiving device determines a stream delay difference between the received audio and video content streams using received delay information 318, 319 and delays at least one of the content streams by the amount of the determined stream delay difference to synchronize the two content streams. The delay information 318, 319 may take various forms as discussed above.

Figure 4:
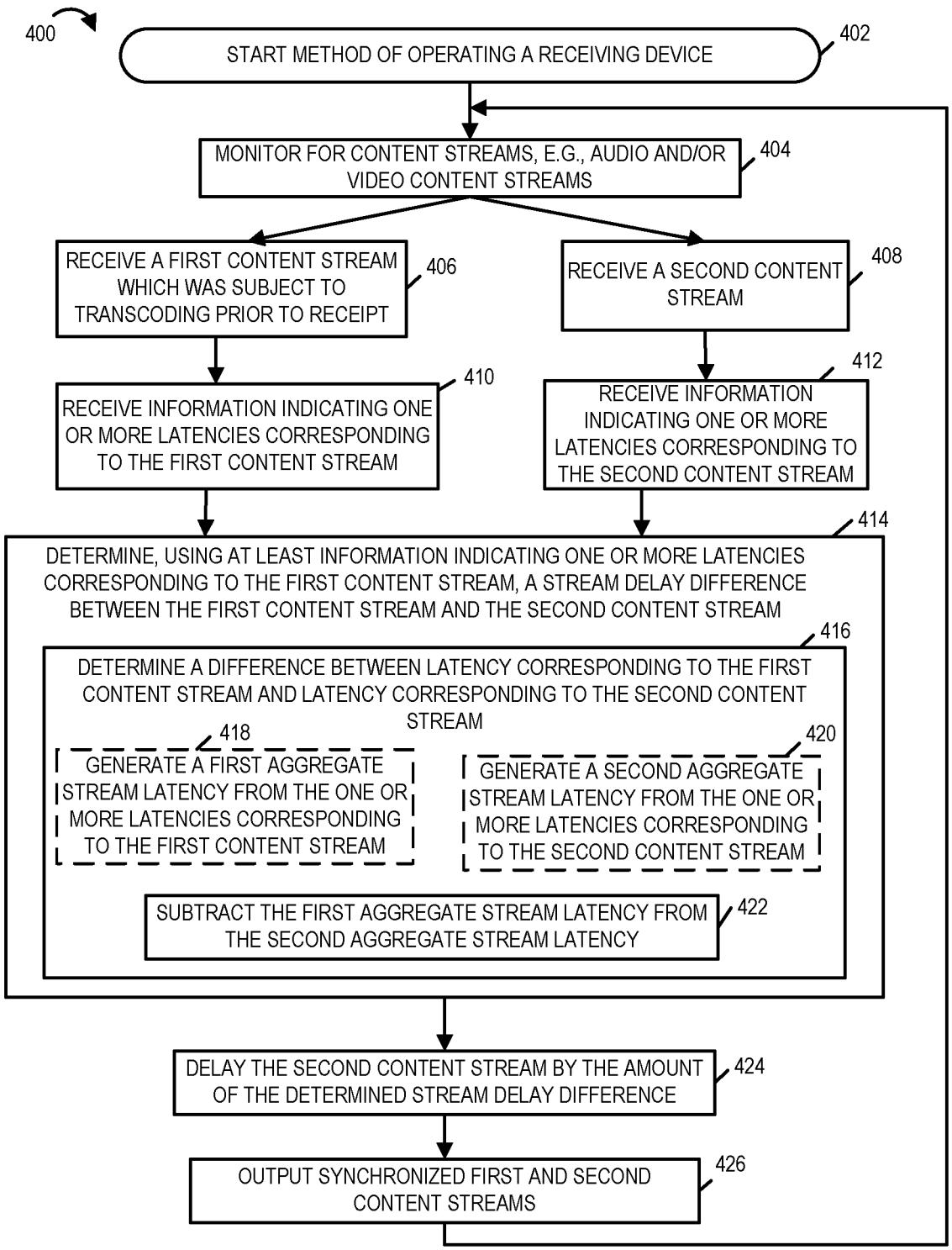
FIG. 4 is a flowchart of an exemplary method of operating a receiving device in accordance with one embodiment of the present invention.

FIG. 4 is a flowchart 400 of an exemplary method of operating a device, e.g., a device receiving audio and video content streams as part of a multimedia session, in accordance with one embodiment of the present invention. The method of flowchart 400 may be implemented by the receiving device shown in the exemplary system 300 of FIG. 3.

The exemplary method starts in step 402, e.g., with the receiving device being powered on and initialized. The operation proceeds from step 402 to step 404 where the device starts monitoring for content streams, e.g., audio and/or video content streams, from one or more devices. The monitoring step 404 may be, and in some embodiments is, performed on an ongoing basis. Operation proceeds from step 404 to steps 406 and 408 which are performed asynchronously in some embodiments and the operation proceeds along the two parallel paths shown in the flowchart.

In step 406 the device receives a first content stream which was subject to a transcoding operation prior to receipt by the device. In various embodiments the first content stream is one of a first audio content stream or a video content steam.

Operation proceeds from step 406 to step 410. In step 410 the receiving device receives information regarding delays and/or latencies introduced into the first content stream. Thus in step 410 the receiving device receives information indicating one or more latencies corresponding to the first content stream. In some embodiments the device receives information indicating a first transcoding delay introduced into the first content stream, the first transcoding delay may be an individual transcoding delay or an aggregate of one or more transcoding delays introduced into the first stream. The delay and/or latency information may be communicated by an upstream device, e.g., a transcoding device. In some embodiments the delay and/or latency information includes information indicating individual delays introduced to the first content stream by one or more transcoding devices upstream of the receiving device. In some embodiments the one or more latencies corresponding to the first content stream is a first aggregate delay which is an aggregate of processing delays introduced into the first content stream in a content delivery path from a source of the first content stream to the receiving device. In some embodiments the processing delays are transcoding delays. Still in some embodiments the receiving device receives delay information from one or more individual transcoding devices that performed transcoding on the second stream, each indicating a transcoding delay that the individual device introduced into the first stream. In some embodiments the information indicating one or more latencies corresponding to the first content stream is communicated by one of a first SDP (Session Description Protocol) attribute, a first SIP message header, a SIP parameter or a first signaling port used to indicate latency information corresponding to the first content stream, or a first notification message providing transcoding delay information for the first content stream. Operation proceeds from step 410 to step 414.

Returning to step 408 along the second branch. In step 408 the device receives a second content stream. In some but not necessarily all embodiments the second content stream is transcoded prior to being received by the receiving device. In some embodiments the second content stream is one of a audio content stream or a video content steam. In some such embodiments the second content stream is a video content stream when the first content stream is an audio content stream and is a audio content stream when the first content stream is a video content stream. Operation proceeds from step 408 to step 412. In step 412 the receiving device receives information indicating one or more latencies corresponding to the second content stream. In some embodiments the one or more delays are introduced in the second content stream, e.g., by one or more transcoding operations, prior to receipt of the second content stream by the receiving device. The delay and/or latency information may be communicated by, e.g., a transcoding device upstream of the receiving device. In some embodiments the one or more latencies corresponding to the second content stream is a second aggregate delay which is an aggregate of processing delays introduced into the second content stream in a content delivery path from a source of the second stream to the receiving device. In at least some embodiments the processing delays are transcoding delays. Still in some embodiments the receiving device receives delay information from one or more individual transcoding devices that performed transcoding on the second stream, each indicating a transcoding delay that the individual device introduced into the second stream. In some embodiments the information indicating one or more latencies corresponding to the second content stream is communicated by one of a second SDP (Session Description Protocol) attribute, a second SIP message header, a second SIP parameter, a second signaling port used to indicate latency information corresponding to the second content stream or a second notification message providing transcoding delay information for the second content stream. In some other embodiments where the second content stream may not have been subject to transcoding prior to being received by the receiving device and no delay information is communicated to the receiving device, it is considered that the processing delay corresponding introduced into the second stream is negligible.

Thus it should be appreciated that the delay and/or latency information corresponding to the first and second streams may individually indicate one or more delays introduced into the streams or may indicate an aggregate processing delays introduced into the first and second streams. Operation proceeds from step 412 to step 414.

Returning now to step 414. In step 414 the device determines a stream delay difference between the first content stream and the second content stream, e.g., based on the received delay information corresponding to at least one content stream. In some embodiments the stream delay difference determination is performed at least using the delay information corresponding to the first content stream. In some embodiments performing step 414 includes performing sub-step 416. In some embodiments performing sub-step 416 further includes performing one or more of steps 418, 420 and 422. In sub-step 416 the device determines a difference between latency corresponding to the first content stream and latency corresponding to the second content stream to determine the stream delay difference. As part of implementing step 416, in some but not all embodiments, the device performs step 418 where a first aggregate stream latency from the one or more latencies corresponding to the first content stream is generated. Further in step 420 the device generates a second aggregate stream latency from the one or more latencies corresponding to the second content stream. Steps 418, 420 are optional (as indicated by the dashed boxes) and are performed in some embodiments where the received information indicating one or more latencies does not indicate the aggregate delays corresponding to the streams nut rather individual delays introduced into the streams by one or more processing operations. When the received information indicating one or more latencies corresponding to the streams indicate aggregate delays corresponding to the streams then the aggregate delays are not generated at the receiving device end.

Once the aggregate stream latencies corresponding to the first and second content stream are generated, in step 422 the device subtracts the first aggregate stream latency from the second aggregate stream latency to determine the stream delay difference. Thus in some embodiments the determined difference between the aggregate stream latencies corresponding to the two content streams is the stream delay difference. In the embodiments where the aggregate stream delays corresponding to the first and second content streams are received and steps 418, 420 are not performed, in such embodiments step 422 includes subtracting the received first aggregate stream latency corresponding to the first stream from the received second aggregate stream latency corresponding to the second stream to determine the stream delay difference.

Operation proceeds from step 414 to step 424. In step 424 the device delays the second content stream by the amount of the determined stream delay difference. For example if the determined aggregate stream latency for the first content stream, e.g., audio content stream, is 30 ms (milli-seconds) and the aggregate stream latency for the second content stream, e.g., video content stream, is 80 ms, the stream delay difference is 50 ms. Thus in accordance with the features of some embodiments the receiving device delays the first stream by 50 ms in order to synchronize the first and second content streams.

Operation proceeds from step 424 to step 426. In step 426 the device outputs synchronized first and second content streams, e.g., to a user of the receiving device. The operation may continue and maybe repeated for one or more additional content streams received by the receiving device.

Figure 5:
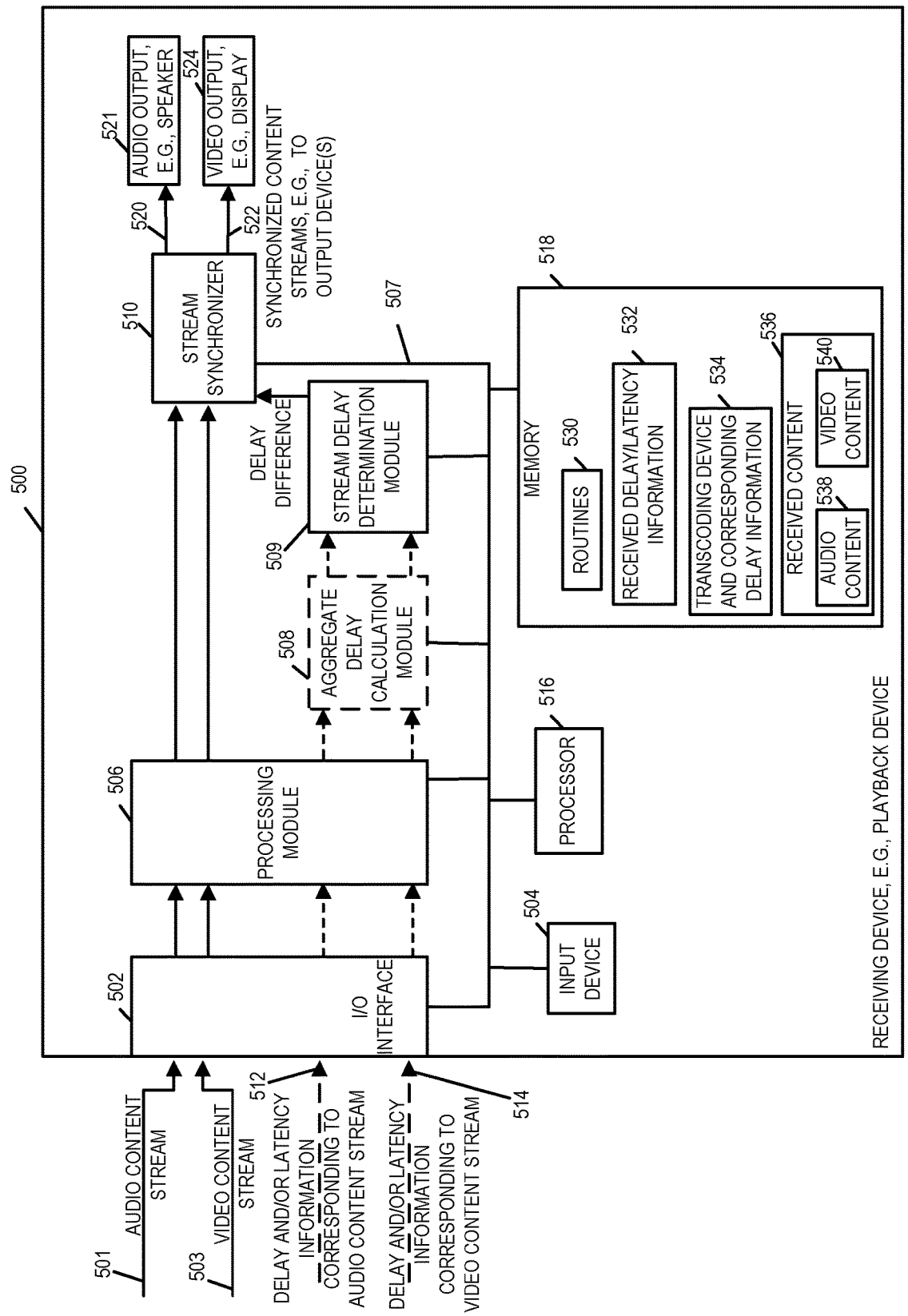
FIG. 5 illustrates an exemplary receiving device and processing performed by the receiving device on content streams based on received control information in accordance with one embodiment.

FIG. 5 illustrates an exemplary receiving device 500 and the processing performed by the device on content streams based on received control information in accordance with one embodiment. The exemplary receiving device 500 can be used as the device 320 of system 300. In some embodiments the receiving device 500 is a content playback device capable of decoding received audio and/or video content and outputting it in a synchronized manner in accordance with the invention to a user of the playback device. In some embodiments the receiving device 500 is configured to implement the steps of the method of flowchart 400.

The exemplary receiving device includes an Input/Output (I/O) interface 502, an input device 504, an information processing module 506, an optional aggregate delay calculation module 508, a stream delay determination module 509, a stream synchronizer 510, a processor 516 and memory 518. The various elements of the receiving device 500 are coupled together via bus 507 via which they exchange information.

The I/O interface 502 includes a transmitter and a receiver. In some embodiments via the I/O interface 502 the receiving device 500 is coupled to a communications network over which information exchange/communication occurs between the receiving device 500 and other devices in the system 300. The input device 504 may be a keypad, touch screen, and/or other device for receiving and processing input commands/instructions.

FIG. 5 illustrates the receiving device 500 receiving an audio content stream 501, e.g., audio RTP stream, and a video content stream 503, e.g., video RTP stream, via the I/O interface 502 of the device 500. In some embodiments at least one of the audio RTP stream 501 or the video RTP stream 503 is transcoded prior to receipt by the receiving device 500. For discussion purposes consider that both RTP streams have been subject to transcoding by different audio and video transcoder respectively prior to their receipt by device 500. Furthermore the delay introduced into the audio RTP stream by a transcoding operation performed on the audio content stream 501 is different from the delay introduced into the video RTP stream 503 by a transcoding operation performed on the video content stream. As discussed earlier, in accordance with one aspect of the invention, in some embodiments the delay and/or latency information is communicated to the receiving device 500 by the one or more transcoders performing transcoding information on the respective audio and video RTP streams. Accordingly, as shown the receiving device 500 receives signals 512 and 514 communicating delay and/or latency information corresponding to the audio content stream 501 and the video content stream 503 respectively. As discussed earlier, the received delay and/or latency information may indicate one or more individual delays introduced into the content streams by one or more individual devices or may indicate aggregate stream delays introduced into each of the streams.

The received audio and video RTP streams 501, 503 and the delay information signals 512, 514 are passed to the processing module 506 for further processing.

The processing module 506 processes the received content streams and information signals. The processing module 506 recovers the delay information corresponding to the audio and video content streams and provides the delay and/or latency information to an aggregate delay calculation module 508 while supplying the processed audio and video content streams to a stream synchronizer 510. In some embodiments the processed audio and video content streams are stored in the memory 518 in the received content buffer 536 as audio content 538 and video content 540.

In accordance with the features of some embodiments, the optional aggregate delay calculation module 508 is configured to generate a first aggregate stream latency from one or more latencies corresponding to the audio content stream 501 communicated in the delay and/or latency information signal 512 and generate a second aggregate stream latency from one or more latencies corresponding to the video content stream 505 communicated in the delay and/or latency information signal 514. The generated aggregate stream latency information is provided to a stream delay determination module 509. In some embodiments where the received delay and/or latency information signals 512, 512 communicate aggregated delays corresponding to the content streams the aggregate delay calculation module 508 may be excluded from the device 500 or may simply not generate aggregate delay information. In such embodiments the recovered delay information is provided by the processing module 506 to the stream delay determination module 509.

The stream delay determination module 509 is configured to determine the difference between latencies corresponding to the audio and video content streams to generate a stream delay difference. In some embodiments the stream delay determination module 509 is configured to determine the stream delay difference by subtracting the first aggregate stream latency from the second aggregate stream latency. The determined stream delay difference is provided to the stream synchronizer 510. The stream synchronizer 510 is configured to synchronize the audio and video content streams and output synchronized audio and video content streams 520, 522. In various embodiments the stream synchronizer 510 delays one of the content streams by the determined stream delay difference so that the two content streams are synchronized prior to being output, e.g., presented to a user. As shown in the illustrated embodiment of the receiving device 500, the synchronized audio content stream is provided to an audio output device 521, e.g., a speaker while the synchronized video content stream is provided to a video output device 524, e.g., display.

The processor 516, e.g., a CPU, executes routines 530 and in some embodiments one or more modules to control the device 500 to operate in accordance with the invention and implement one or more steps of the method of flowchart 400. In some embodiments to control the receiving device 500 and/or elements therein, the processor 516 uses information, various modules and/or routines including instructions stored in memory 518. Memory 518 includes routines 530, received delay/latency information 532 and stored information for transcoding devices and corresponding latencies 534 that they add to content streams. In some embodiments one or more modules shown in the device 500 may also be included in the memory 518.

Routines 530 include communications routines and/or device control routines. Delay/latency information includes the delay information received and stored by the receiving device 500 from one or more upstream device that may have processed the content streams and introduced delays into the streams as part of processing, e.g., transcoding delays. Stored information 534 for transcoding devices and corresponding latencies include information that maps transcoders and/or other devices to corresponding delays that these devices typically introduce to content streams which are processed by these devices. In some embodiments stored information 534 includes a list of transcoders and/or other devices upstream of the receiving device 500 in the content delivery path and the corresponding delay that each of the listed device introduces into a content stream. In some embodiments the receiving device 500 uses the stored information 534 to determine appropriate adjustments, e.g., delay adjustments, to be made to content streams being processed by the receiving device 500 in order to synchronize the content streams.

Figure 6:
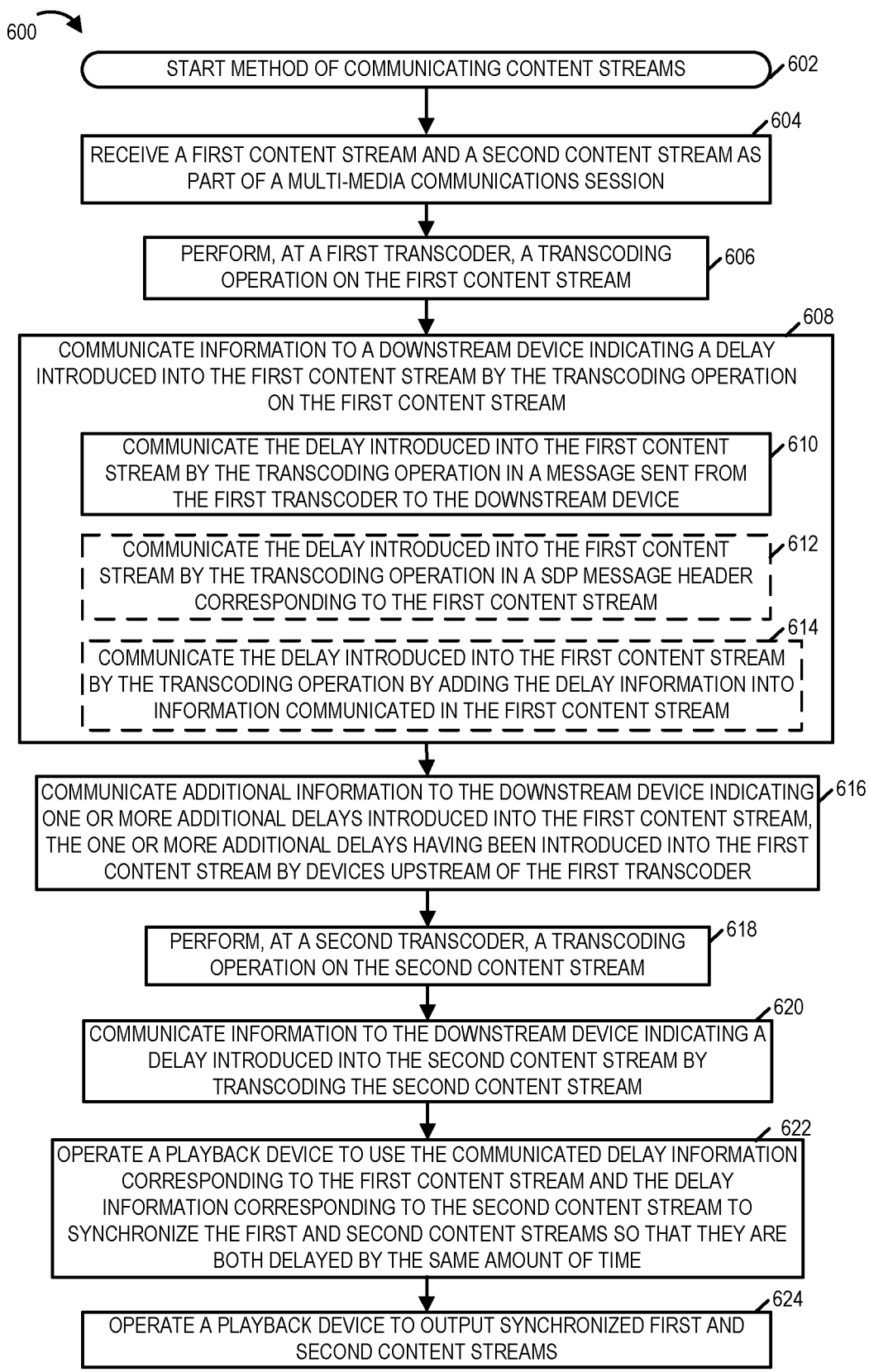
FIG. 6 is a flowchart illustrating the steps of an exemplary method of communicating content in accordance with some exemplary embodiments.

FIG. 6 is a flowchart 600 illustrating the steps of an exemplary method of communicating content streams corresponding to a multi-media communications session in accordance with some exemplary embodiments. The method of flowchart 600 may be implemented using the devices shown in the exemplary system 300 of FIG. 3.

The exemplary method starts in step 602 and the operation proceeds to step 604. In step 604 first and second content streams, e.g., audio and/or video content streams, are received as part of a multi-media communications session. Operation proceeds from step 604 to step 606. In step 606 a first transcoding operation is performed, at a first transcoder, on the first content stream. In various embodiments the first content stream is part of the multi-media communications session which also includes the second content stream. In various embodiments the first transcoder receives the first and second content streams from another device upstream of the first transcoder. In some embodiments the first transcoder transcodes the first content stream but does not transcode the second content stream. In some embodiments the first content stream is one of an audio or a video content stream and the second content stream is also one of an audio or video content stream, only one of the first and second content steams being an audio content stream. In some embodiments the first content stream is an audio content stream and the first transcoder is an audio content transcoder.

Operation proceeds from step 606 to step 608. In step 608 information indicating a delay introduced into the first content stream by the transcoding operation on the first content stream is communicated to a downstream device. In some embodiments performing step 608 includes performing one of the step 610, 612 or 614 which are different alternatives for communicating the delay information. In some embodiments step 610 is performed as part of step 608 where the delay introduced into the first content stream by the transcoding operation is communicated in a message sent from the first transcoder to the downstream device. In some embodiments, step 612 is performed as part of step 608 where the delay introduced into the first content stream by the transcoding is communicated in a SDP attribute, SIP message header/parameter corresponding to the first content stream. In some other embodiments step 614 is performed as part of step 608 where the delay introduced into the first content stream by the transcoding is communicated by adding the delay information into information communicated in the first content stream. Thus it should be appreciated that the delay and/or latency information may be communicated to a downstream device in a variety of ways.

Operation proceeds from step 608 to step 616. In step 616, additional information indicating one or more additional delays introduced into the first content stream by devices upstream of the first transcoder is communicated to the downstream device. For example in some embodiments the first transcoder receives information about delays introduced by other devices upstream of the first transcoder and communicates the delay information along with information about the delay that the transcoding by the first transcoder introduces into the first content stream to the downstream device. While shown as a separate step, the step 616 of communicating additional delay information may, and in some embodiments is, performed as part of step 608. The information indicating one or more delays introduced into the first content stream by one or more devices may be communicated by these individual devices to the downstream device with each device communicating the delay it introduced into the first stream. In some other embodiments an aggregate of the transcoding delays (e.g., first transcoding delay and additional delays introduced by other devices) introduced into the content stream is communicated by a transcoding device to the downstream device.

Operation proceeds from step 616 to step 618. In step 618 a second transcoding operation is performed, at a second transcoder, on the second content stream. In some embodiments the second content stream is a video content stream and the second transcoder is a video transcoder. In some embodiments the second transcoder transcodes the second content stream with performing transcoding operation on the first content stream.

Operation proceeds from step 618 to step 620. In step 620 information indicating a delay introduced into the second content stream by the transcoding operation on the second content stream is communicated to the downstream device. As discussed with regard to step 608 the delay information may be communicated in a variety of ways. In some embodiments the downstream device is one of a transcoder or a playback device. In some embodiments additional information indicating one or more additional delays introduced into the second content stream by devices upstream of the second transcoder is also communicated to the downstream device.

In some embodiments where the downstream device is a playback device the operation proceeds from step 620 to step 622. In step 622 the playback device is operated to use the communicated delay information corresponding to the first content stream and the communicated delay information corresponding to the second content stream to synchronize the first and second content streams so that they are both delayed by the same amount of time.

Operation proceeds from step 622 to step 626. In step 626 the playback device is operated to output synchronized first and second content streams, e.g., to a user of the receiving device. The operation may be repeated for one or more additional content streams.

Figure 7:
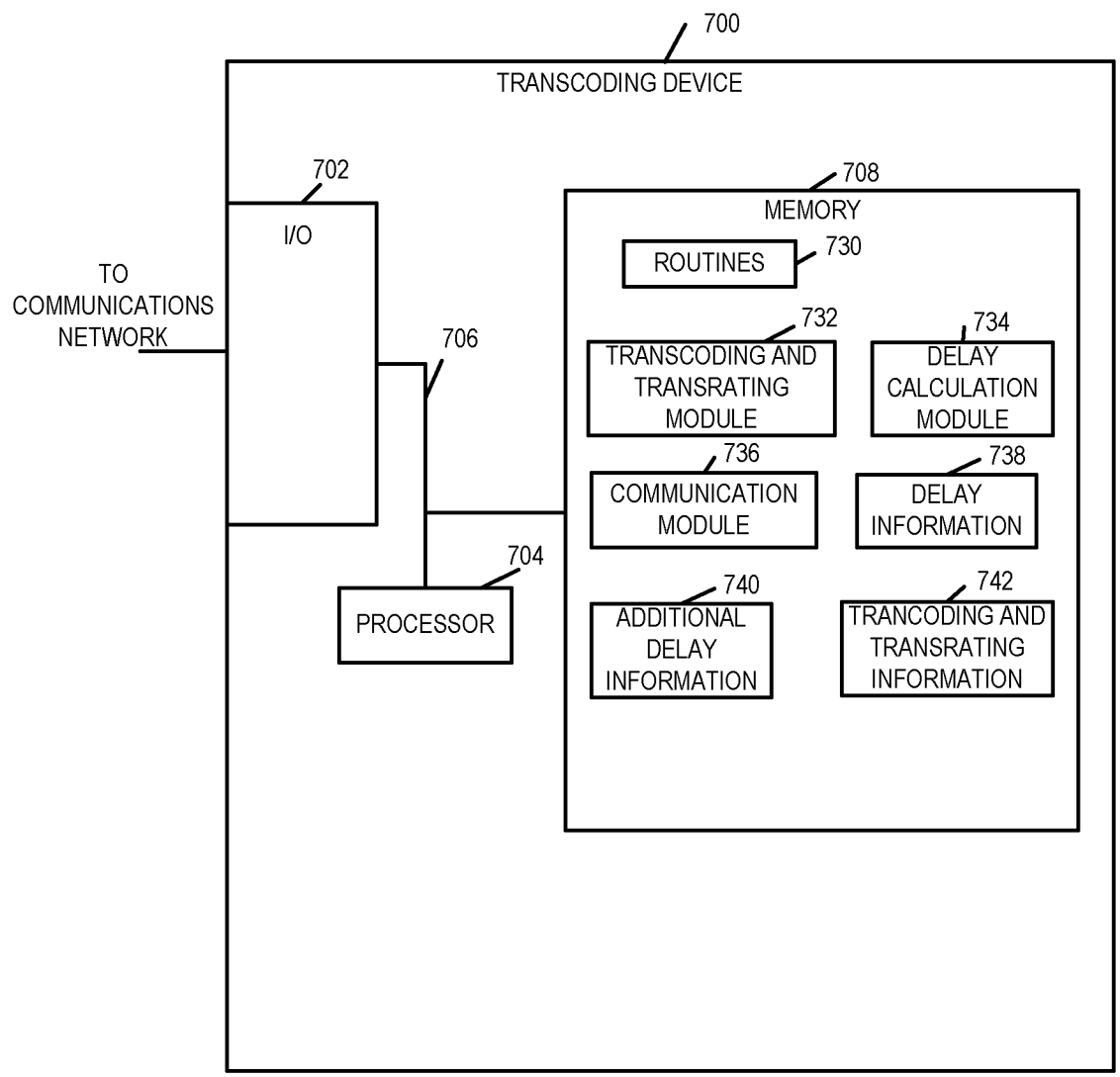
FIG. 7 illustrates an exemplary transcoding device implemented in accordance with one embodiment.

FIG. 7 illustrates an exemplary transcoding device 700 implemented in accordance with one embodiment. The transcoding device 700 may be used as any one of the transcoders shown in FIG. 3. In some embodiments the transcoding device 700 is configured to implement at least some of the steps of the method of flowchart 600. In some embodiments the transcoding device 700 is used in a session The exemplary transcoding device 700 includes an Input/Output (I/O) interface 702, a processor 704 and memory 708. The various elements of the transcoding device 700 are coupled together via bus 706 via which they exchange information.

The I/O interface 702 in some embodiments includes a transmitter and a receiver. Via the I/O interface 502 the transcoding device 700 exchanges information and/or communicates with one or more devices over a communications network. The transcoding device 700 receives one or more content streams, e.g., from a content source and/or other devices, via the I/O interface 702. Furthermore transcoding device 700 sends content streams, e.g., transcoded and/or or non-transcoded content streams, to other devices via the I/O interface 702.

The processor 704, e.g., a CPU, executes routines 730 and in some embodiments one or more modules to control the device 700 to operate in accordance with the invention and implement one or more steps of the method of flowchart 600. In some embodiments to control the transcoding device 700 and/or elements therein, the processor 704 uses information, various modules and/or routines including instructions stored in memory 708.

Memory 708 includes routines 730, a transcoding and transrating module 732, a delay calculation module 734, a communications module 736, delay information 738, additional delay information 740 and stored transcoding and transrating information 742.

Routines 730 include communications routines and/or device control routines. The transcoding and transrating module 732 is configured to transcode and/or transrate a content stream, e.g., audio or video content stream. A content stream which may have been coded according to a first coding standard/format may be, and in some embodiments is, transcoded by the transcoding device 700 to second coding standard/format. In some embodiments the content stream may be subject to transrating operation, e.g., changing the stream bit rate to a different bit rate than the one at which it is received. In some embodiments the transcoding module 732 encodes the content streams according the coding standard supported by a downstream device to which the content streams are to be provided. In some embodiments to transcode and/or transrate a content stream, the transcoding and transrating module 732 uses transcoding and transrating information 742 which includes information regarding coding standards, compression formats and/or data rates that the module 732 may use to perform transcoding and/or transrating operations.

The delay calculation module 734 is configured to determine the delay and/or latency introduced into a content stream subjected to transcoding operation. The delay information 738 which includes the delay and/or latency information corresponding to one or more transcoded content streams is an output of the delay calculation module 734. The additional delay information 740 includes information indicating one or more additional delays introduced into a content stream by other devices, e.g., devices upstream of the transcoding device 700. In some embodiments the transcoding device 700 receives the additional delay information 740 from another upstream device which may have processed, e.g., transcoded, the content stream prior to the content stream being received by the transcoding device 700. Thus in some embodiments the transcoding device 700 receives information 740 about delays introduced by other upstream devices. In some embodiments the delay calculation module 734 is configured to calculate the delay that transcoder 700 introduces into the content stream being transcoded. In some other embodiments delay calculation module 734 is further configured to calculate an aggregate stream delay introduced into the content stream using the additional delay information 740 and the calculated delay that transcoder 700 introduces into the content stream.

The communications module 736 is configured to communicate (e.g., via the interface 702) the delay information 738 to at least one downstream device. In some embodiments the communications module 736 is further configured to communicate (e.g., via the interface 702) the additional delay information 740 along with information 738 about the delay introduced by the transcoding device 700 into the content stream to one or more downstream devices. In some embodiments the communications module 736 is configured to communicate (e.g., via the interface 702) the aggregate delay determined using information 738 and 740 to at least one downstream device. In order to communicate delay information, in some embodiments the communications module 736 is configured to communicate delay/latency information corresponding to a first content stream by one of a first SDP attribute, a first SIP mes4sage header, a SIP parameter, a first signaling port used to indicate latency information corresponding to the first content stream or a first notification message providing transcoding delay information for the first content stream.

While shown as modules or routines in memory, the routines and/or subroutines of the present invention are sometimes implemented in hardware, e.g., as ASICs or other circuits. In such embodiment a circuit is used in place of a routine or subroutine. Thus in at least some embodiments the implementation is made fully in hardware.

In some embodiments the I/O interface 702 is configured to implement the receiving and sending (e.g., communicating) steps performed by the transcoding device 700 while the processor 704 is configured to control the operation of the transcoding device 700 and perform other steps such as performing transcoding and transrating operations, calculate delays introduced into streams by the transcoding operation, update delay information 738 corresponding to content streams when needed.

An exemplary method of operating a device comprises: receiving a first content stream which was subject to transcoding prior to receipt; receiving a second content stream; determining a stream delay difference between said first content stream and said second content stream; and delaying the second content stream by the amount of the determined stream delay difference. In some embodiments the first content stream is one of a first audio content stream and a video content steam. In some embodiments the second content stream is a video content stream when the first content stream is a audio content stream and is a audio content stream when the first content stream is a video content stream.

In some embodiments the exemplary method further comprises: receiving information indicating a first transcoding delay introduced into said first content stream, determining, using at least the first transcoding delay, a difference between latency corresponding to said first content stream and latency corresponding to said second content stream, said determined difference being said stream delay difference. In some embodiments the first transcoding delay is a first aggregate stream delay which is an aggregate of transcoding delays introduced into the first content stream.

In some embodiments the method further comprises receiving a second aggregate stream delay corresponding to the second content stream. In some such embodiments the method further comprises determining the difference between latency corresponding to said first content stream and latency corresponding to said second content stream includes subtracting the first aggregate stream delay from the second aggregate stream delay.

In some embodiments the exemplary method further comprises: receiving information indicating one or more latencies corresponding to the first content stream; and receiving information indicating one or more latencies corresponding to the second content stream. In some embodiments the information indicating one or more latencies corresponding to the first content stream is communicated by one of a first SDP (Session Description Protocol) attribute, a first SIP message header, a SIP parameter, a first signaling port used to indicate latency information corresponding to the first content stream, or a first notification message providing transcoding delay information for the first content stream. In some such embodiments determining a difference between latency corresponding to said first content stream and latency corresponding to the second content stream includes: generating a first aggregate stream latency from one or more latencies corresponding to said first content stream, said one or more latencies including said first transcoding delay as a latency corresponding to the first content stream; generating a second aggregate stream latency from one or more latencies corresponding to said second content stream; and subtracting said first aggregate stream latency from said second aggregate stream latency to determine the stream delay difference. In some embodiments the information indicating one or more latencies corresponding to the second content stream is communicated by one of a second SDP (Session Description Protocol) attribute, a second SIP message header, a second SIP parameter, a second signaling port used to indicate latency information corresponding to the second content stream or a second notification message providing transcoding delay information for the second content stream. In some embodiments the one or more latencies corresponding to the first content stream is a first aggregate delay which is an aggregate of processing delays introduced into the first content stream in a content delivery path from a source of the first content stream to said device. In some embodiments the one or more latencies corresponding to the second content stream is a second aggregate delay which is an aggregate of processing delays introduced into the second content stream in a content delivery path from a source of the second content stream to said device.

An exemplary device in accordance with some embodiments comprises: an interface configured to: i) receive a first content stream which was subject to transcoding prior to receipt; and ii) receive a second content stream; a determination module configured to determine a stream delay difference between said first content stream and said second content stream; and a stream synchronizer configured to delay the second content stream by the amount of the determined stream delay difference.

In some embodiments the first content stream is one of a first audio content stream and a video content steam, and the second content stream is a video content stream when the first content stream is a audio content stream and is a audio content stream when the first content stream is a video content stream. In some embodiments the interface is further configured to receive information indicating a first transcoding delay introduced into said first content stream. In some embodiments the determination module is configured to determine, using at least the first transcoding delay, a difference between latency corresponding to said first content stream and latency corresponding to said second content stream, said determined difference being said stream delay difference.

In some embodiments the first transcoding delay is a first aggregate stream delay corresponding to the first content stream. In some such embodiments the interface is further configured to receive information indicating a second aggregate stream delay corresponding to the second content stream, and the determination module is configured to determine the difference between latency corresponding to said first content stream and latency corresponding to said second content stream by subtracting the first aggregate stream delay from the second aggregate stream delay.

In some embodiments the exemplary device further comprises an aggregate delay calculation module configured to: generate a first aggregate stream latency from one or more latencies corresponding to said first content stream; and generate a second aggregate stream latency from one or more latencies corresponding to said second content stream. In some such embodiments the determination module is further configured to subtract said first aggregate stream latency from said second aggregate stream latency to determine said stream delay difference.

In some embodiments the interface is further configured to receive information indicating the one or more latencies corresponding to the first content stream, and receive information indicating the one or more latencies corresponding to the second content stream. In some embodiments the information indicating one or more latencies corresponding to the first content stream is communicated to said device by one of a first SDP (Session Description Protocol) attribute, a first SIP message header, a SIP parameter, a first signaling port used to indicate latency information corresponding to the first content stream, or a first notification message providing transcoding delay information for the first content stream. In some embodiments the information indicating one or more latencies corresponding to the second content stream is communicated by one of a second SDP (Session Description Protocol) attribute, a second SIP message header, a second SIP parameter, a second signaling port used to indicate latency information corresponding to the second content stream, or a second notification message providing transcoding delay information for the second content stream.

A non-transitory computer readable medium for use in a device comprises: code for causing at least one processor to control the device to receive, via an interface, a first content stream which was subject to transcoding prior to receipt, receive a second content stream, determine a stream delay difference between said first content stream and said second content stream, and a delay the second content stream by the amount of the determined stream delay difference.

An exemplary method of communicating content streams corresponding to a multi-media communications session in accordance with some embodiments, comprises: performing, at a first transcoder, a transcoding operation on a first content stream which is part of said multi-media communications session which also includes a second content stream; and communicating information to a downstream device indicating a delay introduced into the first content stream by said transcoding the first content stream. In some embodiments the first transcoder transcodes the first content stream but does not transcode the second content stream.

In some embodiments communicating information to a downstream device indicating a delay introduced into the first content stream by said transcoding operation on the first content stream includes communicating the delay introduced into the first content stream by said transcoding in a message sent from the first transcoder to said downstream device. In some other embodiments communicating information to a downstream device indicating a delay introduced into the first content stream by said transcoding operation on the first content stream includes communicating the delay introduced into the first content stream by said transcoding in a SDP header corresponding to the first content stream. In still some other embodiments communicating information to a downstream device indicating a delay introduced into the first content stream by said transcoding operation on the first content stream includes communicating the delay introduced into the first content stream by adding the delay information into information communicated in said first content stream.

In some embodiments the exemplary method further comprises: communicating additional information to said downstream device indicating one or more additional delays introduced into said first content stream, said one or more additional delays having been introduced into said first content stream by devices upstream of said first transcoder.

In some embodiments the exemplary method further comprises: performing, at a second transcoder, a transcoding operation on the second content stream; and communicating information to said downstream device indicating a delay introduced into the second content stream by transcoding the second content stream. In some such embodiments the second transcoder is a separate device from said first transcoder and the delay introduced into the second content stream by the second transcoder is different from the delay introduced into the first content stream by the first transcoder. In some embodiments the first content stream is one of an audio and a video content stream and wherein the second content stream is also one of an audio and video content stream, only one of said first and second content steams being an audio content stream. In some embodiments the downstream device is one of another transcoder or a playback device.

In some embodiments where the downstream device is a playback device, the method further comprises operating the playback device to use the communicated delay information corresponding to the first content stream and the communicated delay information corresponding to the second content stream to synchronize the first and second content streams so that they are both delayed by the same amount of time; and outputting the synchronized first and second content streams to a user of the playback device.

An exemplary system used in communicating content streams corresponding to a multi-media communications session in accordance with some embodiments, comprises a first transcoder configured to perform a transcoding operation on a first content stream which is part of a multi-media communications session which also includes a second content stream; and a downstream device, wherein the first transcoder is configured to communicate information, to said downstream device, indicating a delay introduced into the first content stream by said transcoding operation on the first content stream. In some embodiments the first transcoder is configured to transcode the first content stream but not transcode the second content stream.

In some embodiments the first transcoder is further configured to communicate the delay introduced into the first content stream by said transcoding in a message sent to said downstream device as part of being configured to communicate information to the downstream device indicating a delay introduced into the first content stream by said transcoding operation. In some embodiments the first transcoder is further configured to communicate the delay introduced into the first content stream by said transcoding operation in a SDP header corresponding to the first content stream, as part of being configured to communicate information to the downstream device indicating a delay introduced into the first content stream by said transcoding operation. In some embodiments the first transcoder is further configured to communicate the delay introduced into the first content stream by adding the delay information into information communicated in said first content stream, as part of being configured to communicate information to the downstream device indicating a delay introduced into the first content stream by said transcoding operation.

In some embodiments the first transcoder is further configured to communicate additional information to said downstream device indicating one or more additional delays introduced into said first content stream, said one or more additional delays having been introduced into said first content stream by devices upstream of said first transcoder.

In some embodiments the system further comprises: a second transcoder configured to: perform a transcoding operation on the second content stream, and communicate information to said downstream device indicating a delay introduced into the second content stream by transcoding the second content stream. In some embodiments the second transcoder is a separate device from said first transcoder and wherein the delay introduced into the second content stream by the second transcoder is different from the delay introduced into the first content stream by the first transcoder.

In some embodiments the first content stream is one of an audio and a video content stream and wherein the second content stream is also one of an audio and video content stream, only one of said first and second content steams being an audio content stream. In some embodiments the downstream device is one of another transcoder or a playback device.

In some embodiments where the downstream device is a playback device, the playback device is configured to: use the communicated delay information corresponding to the first content stream and the communicated delay information corresponding to the second content stream to synchronize the first and second content streams so that they are both delayed by the same amount of time, and output the synchronized first and second content streams to a user of the playback device.

A non-transitory computer readable medium for use in a device comprises: code for causing at least one processor to control the device to perform a transcoding operation on a first content stream which is part of a multi-media communications session which also includes a second content stream, and communicate information, to a downstream device, indicating a delay introduced into the first content stream by said transcoding operation on the first content stream.

In various embodiments a device of any of one or more of Figures, e.g., receiving device, transcoding device and/or other device, includes a module corresponding to each of the individual steps and/or operations described with regard to any of the Figures in the present application and/or described in the detailed description of the present application. The modules may, and sometimes are implemented in hardware, e.g., as circuits. In other embodiments, the modules may, and sometimes are, implemented as software modules including processor executable instructions which when executed by the processor of device cause the device to implement the corresponding step or operation. In still other embodiments, some or all of the modules are implemented as a combination of hardware and software.

The techniques of various embodiments may be implemented using software, hardware and/or a combination of software and hardware. Various embodiments are directed to apparatus, e.g., session border controllers which may perform transcoding operations, content playback devices, content delivery systems, communication nodes and/or network equipment devices. Various embodiments are also directed to methods, e.g., method of controlling and/or operating devices, content delivery systems, communication nodes and/or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, receiving, signal processing, and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a content receiving device, including a processor configured to implement one, multiple or all of the steps of one or more methods of the invention.

In some embodiments, the processor or processors, e.g., CPUs, of one or more devices, e.g., such as the receiving device and/or the transcoding device, are configured to perform the steps of the methods described as being performed by the devices. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device with a processor which includes a module corresponding to each of the steps of the various described methods performed by the device in which the processor is included. In some but not all embodiments a device includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of operating and/or controlling a device. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a transcoding device or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a playback device, the method comprising:
receiving an audio content stream at the playback device from a first content source, said audio content stream passing in series through a Session Border Controller and a plurality of audio transcoding devices on a first communications path between said first content source and said playback device, said Session Border Controller and one or more of the audio transcoding devices performing an audio transcoding operation on the audio content stream;
receiving a video content stream at the playback device from the first content source, said video content stream passing in series through said Session Border Controller and a plurality of video transcoding devices on a second communications path between the first content source and the playback device, said plurality of video transcoding devices performing a video transcoding operation on the video content stream;
determining, by the playback device, a stream delay difference between said audio content stream and said video content stream; [[and]]
synchronizing, by the playback device, playback of the audio content stream and the video content stream using the determined stream delay difference; and
wherein said video content stream passes through said Session Border Controller without said Session Border Controller performing a video transcoding operation on said video content stream.

2. The method of claim 1, further comprising:
receiving by the playback device information indicating a first audio transcoding delay introduced into said audio content stream by said Session Border Controller; and
receiving by the playback device information indicating a second audio transcoding delay introduced into said audio content stream by one of said plurality of audio transcoding devices.

3. The method of claim 2, further comprising:
receiving by the playback device information indicating a first video transcoding delay introduced into the video content stream by a first video transcoding device, said first video transcoding device being one of said plurality of video transcoding devices; and
receiving by the playback device information indicating a second video transcoding delay introduced into the video content stream by a second video transcoding device, said second video transcoding device also being one of said plurality of video transcoding devices.

4. The method of claim 3, wherein said determining, by the playback device, a stream delay difference between said audio content stream and said video content stream includes:
determining, using the received information indicating the first audio transcoding delay, the second audio transcoding delay, the first video transcoding delay, and the second video transcoding delay, a difference between latency corresponding to said audio content stream and latency corresponding to said video content stream, said determined difference being said stream delay difference.

5. The method of claim 1, wherein said first communications path and said second communications path are separate communications paths from the first content source to the playback device, said first communications path and said second communications path both including the Session Border Controller.

6. The method of claim 1, further comprising:
receiving, by the playback device, information indicating a plurality of latencies corresponding to the audio content stream from the Session Border Controller and the plurality of audio transcoding devices; and
receiving, by the playback device, information indicating a plurality of latencies corresponding to the video content stream from the plurality of video transcoding devices.

7. The method of claim 6, wherein said stream delay difference is determined based on said received information indicating a plurality of latencies corresponding to the audio content stream and said received information indicating a plurality of latencies corresponding to the video content stream.

8. The method of claim 6, wherein said information indicating a plurality of latencies corresponding to the audio content stream is communicated via information included in a SIP message header corresponding to the audio content stream.

9. A method of operating a playback device, the method comprising:
receiving an audio content stream at the playback device from a first content source, said audio content stream passing through a Session Border Controller and a plurality of audio transcoding devices on a first communications path between said first content source and said playback device, said Session Border Controller and one or more of the audio transcoding devices performing an audio transcoding operation on the audio content stream;
receiving a video content stream at the playback device from the first content source, said video content stream passing through said Session Border Controller and a plurality of video transcoding devices on a second communications path between the first content source and the playback device, said plurality of video transcoding devices performing a video transcoding operation on the video content stream;
receiving by the playback device information indicating a first audio transcoding delay introduced into said audio content stream by said Session Border Controller;
receiving by the playback device information indicating a second audio transcoding delay introduced into said audio content stream by one of said plurality of audio transcoding devices;
receiving by the playback device information indicating a first video transcoding delay introduced into the video content stream by a first video transcoding device, said first video transcoding device being one of said plurality of video transcoding devices;
receiving by the playback device information indicating a second video transcoding delay introduced into the video content stream by a second video transcoding device, said second video transcoding device also being one of said plurality of video transcoding devices;
determining, by the playback device, a stream delay difference between said audio content stream and said video content stream;
synchronizing playback of the audio content stream and the video content stream using the determined stream delay difference; and
wherein said determining, by the playback device, a stream delay difference between said audio content stream and said video content stream includes:
determining, using the received information indicating the first audio transcoding delay, the second audio transcoding delay, the first video transcoding delay, and the second video transcoding delay, a difference between latency corresponding to said audio content stream and latency corresponding to said video content stream, said determined difference being said stream delay difference.

10. The method of claim 9 wherein said video content stream passes through said Session Border Controller without said Session Border Controller performing a video transcoding operation on said video content stream.

11. A method of communicating content streams corresponding to a multi-media communications session, the method comprising:
receiving, at a Session Border Controller, an audio content stream and a video content stream which are part of said multi-media communications session;
performing, at the Session Border Controller, an audio transcoding operation on said audio content stream;
performing, at a video transcoder, a video transcoding operation on the video content stream;
communicating said audio content stream on which said audio transcoding operation has been performed and said video content stream on which said video transcoding operation has been performed to a downstream device;
communicating information to the downstream device indicating a delay introduced into the audio content stream by said audio transcoding operation performed on the audio content stream by the Session Border Controller;
communicating additional information to said downstream device indicating one or more additional delays introduced into said audio content stream, said one or more additional delays having been introduced into said audio content stream by devices upstream of said Session Border Controller;
communicating information to said downstream device indicating a delay introduced into the video content stream by the video transcoding operation performed on the video content stream; and
wherein said downstream device is a playback device, the method further comprising:
operating the playback device to use the communicated delay information corresponding to the audio content stream and the communicated delay information corresponding to the video content stream to synchronize the audio and video content streams so that they are both delayed by the same amount of time; and
outputting the synchronized audio and video content streams to a user of the playback device.

12. The method of claim 11, wherein communicating additional information to said downstream device indicating one or more additional delays introduced into said audio content stream includes communicating said additional information in a Session Initiation Protocol header.

13. The method of claim 11, wherein said additional information communicated to said downstream device indicating one or more additional delays introduced into said audio content stream includes a transrating delay introduced into said audio content stream by a device upstream from said Session Border Controller.

14. The method of claim 11, wherein said video transcoder is a separate device from said Session Border Controller and wherein the delay introduced into the video content stream by the video transcoder is different from the delay introduced into the audio content stream by the Session Border Controller, said Session Border Controller communicating said received video content stream without performing a video transcoding operation on said video content stream.

15. A playback device comprising:
memory; and
a processor, said processor controlling the playback device to perform the following operations:
receive an audio content stream at the playback device from a first content source, said audio content stream passing in series through a Session Border Controller and a plurality of audio transcoding devices on a first communications path between said first content source and said playback device, said Session Border Controller and one or more of the audio transcoding devices performing an audio transcoding operation on the audio content stream;

receive a video content stream at the playback device from the first content source, said video content stream passing in series through said Session Border Controller and a plurality of video transcoding devices on a second communications path between the first content source and the playback device, said plurality of video transcoding devices performing a video transcoding operation on the video content stream;

determine, by the playback device, a stream delay difference between said audio content stream and said video content stream;

synchronize playback of the audio content stream and the video content stream using the determined stream delay difference; and wherein said video content stream passes through said Session Border Controller without said Session Border Controller performing a video transcoding operation on said video content stream.

16. The playback device of claim 15, wherein said processor further controls the playback device to perform the following additional operations:

receive by the playback device information indicating a first audio transcoding delay introduced into said audio content stream by said Session Border Controller; and receive by the playback device information indicating a second audio transcoding delay introduced into said audio content stream by one of said plurality of audio transcoding devices.

17. The playback device of claim 16, wherein said processor further controls the playback device to perform the following additional operations:

receive by the playback device information indicating a first video transcoding delay introduced into the video content stream by a first video transcoding device, said first video transcoding device being one of said plurality of video transcoding devices; and receive by the playback device information indicating a second video transcoding delay introduced into the video content stream by a second video transcoding device, said second video transcoding device also being one of said plurality of video transcoding devices.

18. The playback device of claim 17, wherein said operation to determine, by the playback device, a stream delay difference between said audio content stream and said video content stream includes:

determining, using the received information indicating the first audio transcoding delay, the second audio transcoding delay, the first video transcoding delay, and the second video transcoding delay, a difference between latency corresponding to said audio content stream and latency corresponding to said video content stream, said determined difference being said stream delay difference.

19. The playback device of claim 15, wherein said processor further controls the playback device to perform the following additional operations:

receive information indicating a plurality of latencies corresponding to the audio content stream from the Session Border Controller and the plurality of audio transcoding devices;

receive information indicating a plurality of latencies corresponding to the video content stream from the plurality of video transcoding devices; and wherein said stream delay difference is determined based on said received information indicating a plurality of latencies corresponding to the audio content stream and said received information indicating a plurality of latencies corresponding to the video content stream.

20. The method of claim 19, wherein said information indicating a plurality of latencies corresponding to the audio content stream is communicated via information included in a SIP message header corresponding to the audio content stream.

* * * * *